United States Patent
Liu et al.

(10) Patent No.: US 8,466,895 B2
(45) Date of Patent: Jun. 18, 2013

(54) POSITIONING METHOD AND DRIVING APPARATUS FOR TOUCH PANEL

(75) Inventors: Jui-Ming Liu, Tainan County (TW); Chung-Wen Chang, Tainan County (TW); Feng-Wei Yang, Tainan County (TW); Shen-Feng Tai, Tainan County (TW)

(73) Assignee: Himax Tecnologies Limited, Tainan (TW)

( * ) Notice: Subject to any disclaimer, the term of this patent is extended or adjusted under 35 U.S.C. 154(b) by 320 days.

(21) Appl. No.: 13/027,474

(22) Filed: Feb. 15, 2011

(65) Prior Publication Data

US 2012/0044162 A1 Feb. 23, 2012

Related U.S. Application Data

(60) Provisional application No. 61/375,246, filed on Aug. 20, 2010.

(51) Int. Cl.
*G06F 3/041* (2006.01)

(52) U.S. Cl.
USPC .......... 345/173; 345/156; 345/174; 178/18.06

(58) Field of Classification Search
USPC ................. 345/156–179; 178/18.01–18.09
See application file for complete search history.

(56) References Cited

U.S. PATENT DOCUMENTS

| 2006/0192690 A1* | 8/2006 | Philipp | 341/33 |
| 2009/0160761 A1* | 6/2009 | Moosavi et al. | 345/156 |
| 2010/0321337 A1* | 12/2010 | Liao et al. | 345/174 |

* cited by examiner

*Primary Examiner* — Amare Mengistu
*Assistant Examiner* — Premal Patel
(74) *Attorney, Agent, or Firm* — J.C. Patents

(57) ABSTRACT

A positioning method and a driving apparatus for a touch panel having a plurality of sense electrodes in an axis direction are disclosed. The driving apparatus detects the sense electrodes to obtain a plurality of sensed values. The driving apparatus counts the number of multiple candidate electrodes, wherein the candidate electrode is an electrode having a sensed value larger than a first threshold value. The first threshold value is increased and the number of the candidate electrodes is counted again if the number of the candidate electrodes is larger than a second threshold value. At least one electrode is selected as a positioning electrode from the candidate electrodes if the number of the candidate electrode is not larger than the second threshold value. A position of a touch point on the touch panel in the axis direction is calculated based on the position and sensed value of the positioning electrode.

20 Claims, 5 Drawing Sheets

POSITIONING METHOD AND DRIVING APPARATUS FOR TOUCH PANEL

CROSS-REFERENCE TO RELATED APPLICATION

This application claims the priority benefit of U.S. provisional application Ser. No. 61/375,246, filed on Aug. 20, 2010. The entirety of the above-mentioned patent application is hereby incorporated by reference herein and made a part of this specification.

BACKGROUND OF THE INVENTION

1. Field of the Invention

The present invention relates to a touch device, and more particularly, to a positioning method and driving apparatus for a touch panel.

2. Description of Related Art

Many electronic products have employed a touch panel to replace the traditional keyboards or mouses as an input interface for facilitating operation and reducing product size. For example, various types of flat display panels can be equipped with a touch panel such that the flat display can have both the image displaying and the operation information inputting functions. Traditional touch panels mainly include capacitive, resistive, infrared and surface wave touch panels. Different types of touch panels have their own advantages and disadvantages. For example, the capacitive touch panel has the advantages of good texture and small touch force. Precisely positioning a touch point on the touch panel has been desired regardless of the type of the touch panel.

SUMMARY OF THE INVENTION

Accordingly, the present invention is directed to a positioning method for a touch panel and a driving apparatus carrying out this positioning method to calculate a position of a touch point on the touch panel.

One embodiment of the present invention provides a positioning method for a touch panel having a plurality of sense electrodes in an axis direction. The positioning method includes detecting the sense electrodes to obtain multiple sensed values; performing a checking step to find a plurality of candidate electrodes from the sense electrodes, each candidate electrode having a sensed value larger than a first threshold value; performing a counting step to count the number of the candidate electrodes; increasing the first threshold value and then performing the checking step and the counting step again if the number of the candidate electrodes is larger than a second threshold value; performing a selecting step to select at least one electrode as a positioning electrode from the candidate electrodes if the number of the candidate electrode is not larger than the second threshold value; and performing a calculating step to calculate a position of a touch point on the touch panel in the axis direction based on the position and sensed value of the positioning electrode.

One embodiment of present invention provides a driving apparatus for a touch panel having a plurality of sense electrodes in an axis direction. The driving apparatus includes a driving unit and a processing unit. The driving unit drives and detects the sense electrodes of the touch panel to output a plurality of sensed values of the sense electrodes. The processing unit receives the sensed values. The processing unit performs a checking step to find a plurality of candidate electrodes from the sense electrodes, each candidate electrode having a sensed value larger than a first threshold value. The processing unit performs a counting step to count the number of the candidate electrodes. The processing unit increases the first threshold value and then performs the checking step and the counting step again if the number of the candidate electrodes is larger than a second threshold value. The processing unit performs a selecting step to select at least one electrode as a positioning electrode from the candidate electrodes if the number of the candidate electrode is not larger than the second threshold value. The processing unit performs a calculating step to calculate a position of a touch point on the touch panel in the axis direction based on the position and sensed value of the positioning electrode.

In one embodiment, the calculating step includes: calculating a first shift value $L\_shift=(L/M)\times(D/2)$, wherein M is the sensed value of the positioning electrode, L is the sensed value of a left side adjacent electrode adjacent the positioning electrode, and D is a distance between centerlines of two adjacent sense electrodes; calculating a second shift value $R\_shift=(R/M)\times(D/2)$, wherein R is the sensed value of a right side adjacent electrode adjacent the positioning electrode; and calculating the position of the touch point on the touch panel in the axis direction as $MP-L\_shift+R\_shift$ or $MP+L\_shift-R\_shift$, wherein MP is the position of the positioning electrode.

In one embodiment, the calculating step includes: calculating a third shift value $L\_shift1=(L1/M)\times(D/2)\times r1$, wherein M is the sensed value of the positioning electrode, L1 is the sensed value of a left side adjacent electrode adjacent the positioning electrode, D is a distance between centerlines of two adjacent sense electrodes, and r1 is a coefficient ranging between 0-1; calculating a fourth shift value $L\_shift2=(L2/M)\times(D/2)\times r2$, wherein L2 is the sensed value of a left side adjacent electrode adjacent the electrode L1, and r2 is a coefficient ranging between 0-1; calculating a fifth shift value $R\_shift1=(R1/M)\times(D/2)\times r1$, wherein R1 is the sensed value of a right side adjacent electrode adjacent the positioning electrode; calculating a sixth shift value $R\_shift2=(R2/M)\times(D/2)\times r2$, wherein R2 is the sensed value of a right side adjacent electrode adjacent the electrode R1; and calculating the position of the touch point on the touch panel in the axis direction as $MP-L\_shift1-L\_shift2+R\_shift1+R\_shift2$ or $MP+L\_shift1+L\_shift2-R\_shift1-R\_shift2$, wherein MP is the position of the positioning electrode.

In view of the foregoing, in embodiments of the present invention, multiple candidate electrodes associated with the touch point are found from multiple sense electrodes by dynamic modification of the first threshold value and a positioning electrode is then selected from the candidate electrodes. the position of the touch point on the touch panel is then calculated using the position and sensed value of the positioning electrode.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purposes of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
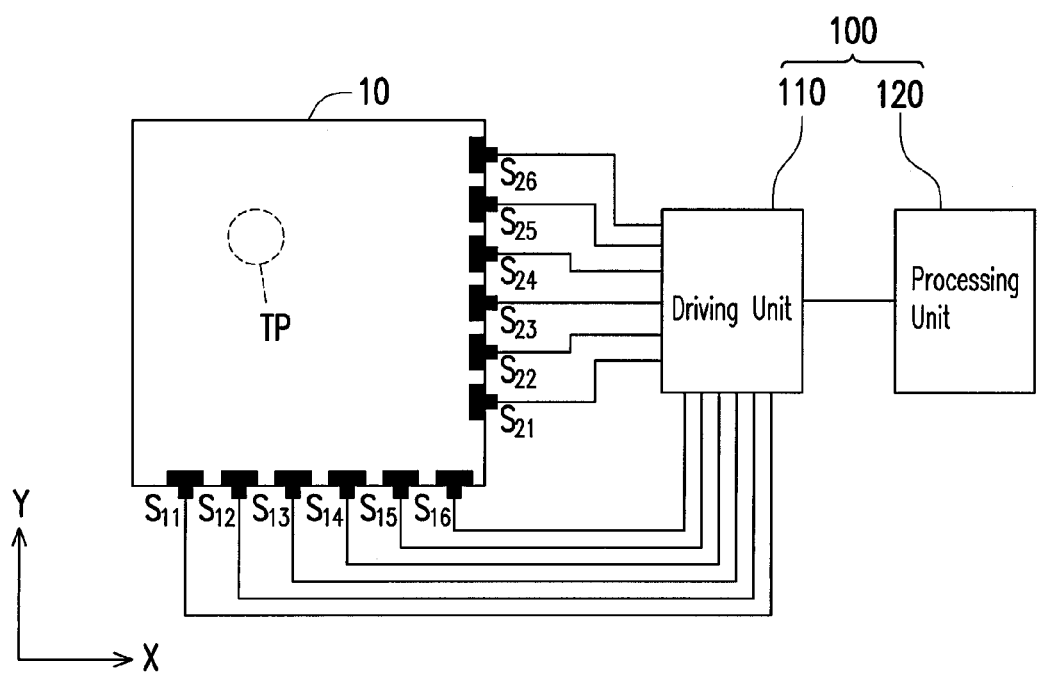
FIG. 1 is a functional block diagram of a touch panel and a driving apparatus according one embodiment of the present invention.

FIG. 1 is a functional block diagram of a touch panel 10 and a driving apparatus 100 according one embodiment of the present invention. The driving apparatus 100 includes a driving unit 110 and a processing unit 120. The touch panel 10 may be any type of touch panel, such as, capacitive touch panel, resistive touch panel, or another type of touch panel. The driving unit 110 may be any type of driving/detecting circuit corresponding to the touch panel 10. The touch panel 10 and its associated driving unit 110 are known in the art and explanation thereof therefore is not repeated herein.

FIG. 1 shows the diagram in the Cartesian coordinate system including X-axis and Y-axis that are orthogonal to each other. The touch panel 10 includes a plurality of sense electrodes, for example, sense electrodes S11, S12, S13, S14, S15, S16, along the X-axis. The touch panel 10 includes a plurality of sense electrodes, for example, sense electrodes S21, S22, S23, S24, S25, S26, along the Y-axis. While only the sense electrodes S11 to S16 and S21 to S26 are shown in FIG. 1, it is noted that the number of the sense electrodes may vary based on the size of the touch panel and actual requirements.

Referring to FIG. 1, the driving unit 110 is connected to the sense electrodes S11 to S16 and S21 to S26. The driving unit 110 drives and detects the sense electrodes S11 to S16 and S21 to S26 to output the sensed values (also referred to as "raw count values") of the sense electrodes S11 to S16 and S21 to S26 to the processing unit 120.

Figure 2:
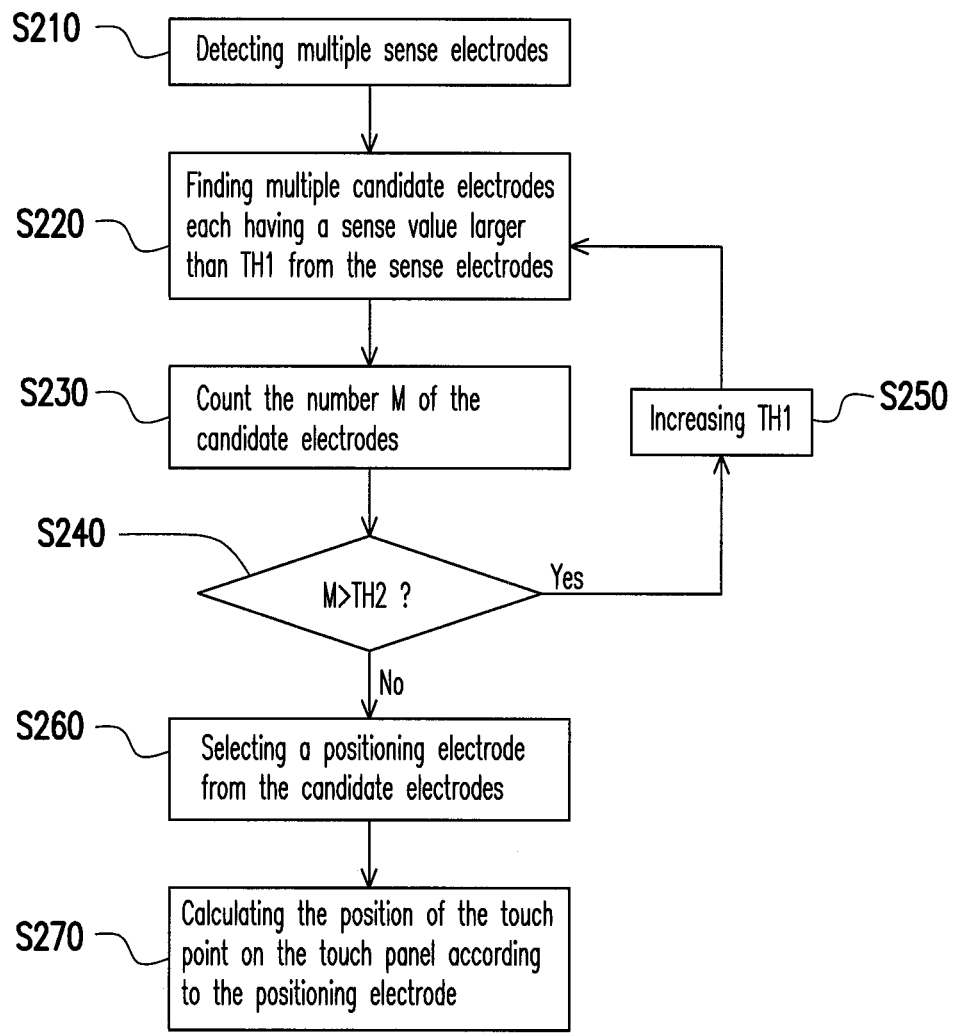
FIG. 2 is a flowchart showing the positioning method of the touch panel according to one embodiment of the present invention.

For sake of simplified description, in the following embodiment, operation of the touch panel 10 is described with reference to only one touch point TP. In practice, the positioning method of the present embodiment can be adapted to multi-touch points. In addition, the following embodiment may be applied in any touch panel driving/detecting mode. FIG. 2 is a flowchart showing the positioning method of the touch panel 10 according to the present embodiment. Referring to FIG. 1 and FIG. 2, the processing unit 120 detects the touch panel 10 through the driving unit 110, to obtain the sensed values of the sense electrodes S11 to S16 and the sensed values of the sense electrode S21 to S26 (step S210).

Figure 3:
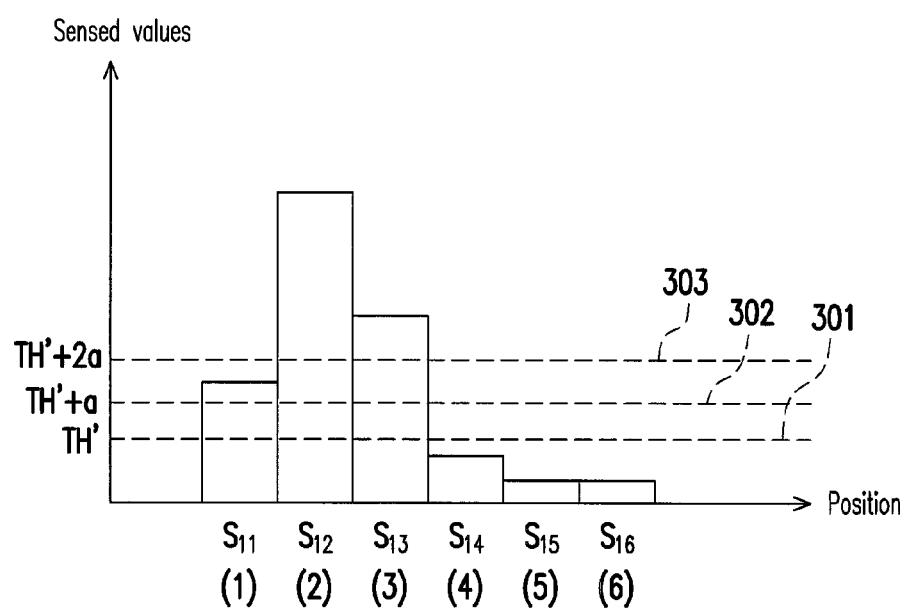
FIG. 3 shows the exemplary sensed values of the sense electrodes S11 to S16 of FIG. 1 according one embodiment of the present invention.

FIG. 3 shows exemplary sensed values of the sense electrodes S11 to S16 of FIG. 1 according to the present embodiment. In FIG. 3, the X-axis represents the position of the sensed values S11 to S16, and the Y-axis represents the sensed values. Since the touch point TP is located between the sensed electrodes S12 and S13 and closer to the second electrode S12, a relative extreme occurs at S12 of FIG. 3.

Next, the processing unit 120 performs a "checking step" to find a plurality of candidate electrodes each having a sensed value larger than a first threshold value TH1 from the sense electrodes S11 to S16 (step S220). Here it is assumed that the first threshold value TH1 is set as an initial TH', for example, as indicated by the broken line 301 in FIG. 3. Taking the sensed values of FIG. 3 as an example, the sensed values of the sense electrodes S14 to S16 are smaller than the first threshold value TH1, while the sensed values of the sense electrodes S11 to S13 are larger than the first threshold value TH1. Thus, the processing unit 120 finds the sensed values S11 to S13 as the candidate electrodes at step S220.

Next, the processing unit 120 performs a "counting step" to count the number M of the candidate electrodes (step S230). At this time, the number M of the candidate electrodes (S11 to S13) is "3". At step S240, it is determined whether the number M of the candidate electrodes is larger than a second threshold value TH2. Here it is assumed that the second threshold value TH2 is set as "2". Because the number M of the candidate electrodes at this time is larger than 2, the processing unit 120 increases the first threshold value TH1 (step S250). Increasing the first threshold value TH1 at step S250 may be performed by adding a preset fixed value a to the first threshold value TH1. This fixed value a is determined based on actual requirements. After the step S250 is completed, the first threshold value TH1 is modified to TH'+a, for example, as indicated by broken line 302 of FIG. 3.

After the modification of the first threshold value TH1, the processing unit 120 performs the checking step (step S220) and the counting step (S230) once again. At this time, the sensed values of the sense electrodes S11 to S13 are still larger than the first threshold value TH1 (broken line 302). Therefore, the processing unit 120 finds the sense electrodes S11 to S13 as the candidate electrodes at step S220. Because the number M of the candidate electrodes at this time is still larger than the second threshold value TH2, the processing unit 120 performs the step S250 again to increase the first threshold value TH1. After the step S250 is completed, the first threshold value TH1 is modified to TH'+a+a, for example, as indicated by broken line 303.

After the modification of the first threshold value TH1, the processing unit 120 performs the checking step (step S220) and the counting step (step S230) again. At this time, the sense values of only the sense electrodes S12 to S13 are larger than the first threshold value TH1 (broken line 302). Therefore, the processing unit 120 finds the sense electrodes S12 and S13 as the candidate electrodes at step S220. Because the number M of the candidate electrodes at this time is "2", which is not larger than the second threshold value TH2, the processing unit 120 performs a "selecting step" to select at least one electrode as a "positioning electrode" from the candidate electrode S12 and S13 (step S260). In this embodiment, the at least one electrode may be selected as the "positioning electrode" from the multiple candidate according to any suitable rule, depending upon actual needs. For example, the electrode as the "positioning electrode" may be randomly selected from the candidate electrodes.

In another example, at step S260, a smallest index value may be found from index values of the candidate electrodes, and the electrode associated with this smallest index value may be selected as the "positioning electrode" from the candidate electrodes. Taking the candidate electrodes S12 and S13 of FIG. 3 as an example, their index values are "2" and "3", respectively, and then the smallest index value is "2". Therefore, at step S260, the electrode S12 can be selected as the "positioning electrode" from the candidate electrodes S12 and S13.

In another example, at step S260, a middle index value may be found from the index values of the candidate electrodes, and the electrode associated with the middle index value may be selected as the "positioning electrode" from the candidate electrodes. For example, it is assumed that the second threshold value TH2 is set as "5". As such, five sense electrodes are selected as the candidate electrodes. Assuming the index values of the five candidate electrodes are, "10", "11", "12", "13", and "14", the middle index value "12" can be found from the index values of the candidate electrodes at step s260, and the electrode associated with the index value "12" is selected as the "positioning electrode."

In the present embodiment, a largest index value is found from the index values of the candidate electrodes at step S260, and the electrode associated with the largest index value is selected as the "positioning electrode" from the candidate electrodes. Taking the candidate electrodes S12 and S13 of FIG. 3 as an example, their index values are "2" and "3", respectively. As such, the largest index value is "3". Therefore, the electrode S12 can be selected as the "positioning electrode" from these candidate electrodes S12 to S13 at step S260.

The processing unit 120 then performs a "calculating step" to calculate the position of touch point TP on the touch panel 10 in the X-axis direction according to the position and sensed value of the positioning electrode (step S270). Any suitable algorithm can be used to perform step S270 depending upon the actual needs. For example, at step S270, the position of the touch point TP on the touch panel 10 in the X-axis direction may be calculated according to the position of the "positioning electrode", the sensed value of the "positioning electrode", and the sensed values of multiple sense electrodes adjacent the "positioning electrode". Taking FIG. 3 as an example, the processing unit 120 calculates the position of the touch point TP on the touch panel 10 in the X-axis direction according to the position of the electrode S13, the sensed value of the electrode S13, the sensed value of the electrode S12, and the sensed value of the electrode S14. Assuming that the position of the "positioning electrode" S13 is MP, the sensed value of the "positioning electrode" S13 is M, the sensed value of the left side adjacent electrode S12 adjacent the "positioning electrode" S13 is L, the sensed value of the right side adjacent electrode S14 adjacent the "positioning electrode" S13 is R, and the distance between centerlines of two adjacent sense electrodes on the touch panel is D, then, in the present embodiment, a first shift value L_shift and a second shift value R_shift may be obtained using the following Equation 1 and Equation 2 at step S270, and the position TPX of the touch point TP on the touch panel 10 in the X-axis direction can be obtained by correcting the position MP of the "positioning electrode" using the following Equation 3.

$$L\_shift = (L/M) \times (D/2) \quad \text{Equation 1}$$

$$R\_shift = (R/M) \times (D/2) \quad \text{Equation 2}$$

$$TPX = MP - L\_shift + R\_shift \quad \text{Equation 3}$$

Referring to FIG. 3, the precondition for Equation 3 is assuming that the origin of the coordinate system is on the left side of the electrodes S12 to S14. If the origin of the coordinate system is on the right side of the electrodes S12 to S14, then the processing unit 120 may obtain the position TPX of the touch point TP on the touch panel 10 in the X-axis direction by calculating the Equation 4.

$$TPX = MP + L\_shift - R\_shift \quad \text{Equation 4}$$

In the above embodiment, the sensed values of the "positioning electrode" and one left side adjacent electrode and one right side adjacent electrode are used. In another embodiment, the sensed values of additional electrodes may be used to calculate the position TPX of the touch point TP on the touch panel 10 in the X-axis direction at step S270. If taking FIG. 3 as an example, assuming that the sensed value of the left side adjacent electrode S12 adjacent the "positioning electrode" S13 is L1, the sensed value of the left side adjacent electrode S11 adjacent the electrode S12 is L2, the sensed value of the right side adjacent electrode S14 adjacent the "positioning electrode" S13 is R1, and the sensed value of the right side adjacent electrode S15 adjacent the electrode S14 is R2, then the position TPX of the touch point TP on the touch panel 10 in the X-axis direction may be calculated by using the sensed values M, L1, L2, R1, and R2. At step S270 of the present embodiment, a third shift value L_shift1 and a fourth L_shift2 may be obtained using Equation 5 and Equation 6, a fifth shift value R_shift1 and a sixth R_shift2 may be obtained using Equation 7 and Equation 8, and then the position TPX of the touch point TP on the touch panel 10 in the X-axis direction can be obtained by correcting the position MP of the "positioning electrode" using the Equation 9. r1 and r2 are coefficients ranging between 0-1 and r1+r2=1.

$$L\_shift1 = (L1/M) \times (D/2) \times r1 \quad \text{Equation 5}$$

$$L\_shift2 = (L2/M) \times (D/2) \times r2 \quad \text{Equation 6}$$

$$R\_shift1 = (R1/M) \times (D/2) \times r1 \quad \text{Equation 7}$$

$$R\_shift2 = (R2/M) \times (D/2) \times r2 \quad \text{Equation 8}$$

$$TPX = MP - L\_shift1 - L\_shift2 + R\_shift1 + R\_shift2 \quad \text{Equation 9}$$

The precondition for Equation 9 is assuming that the origin of the coordinate system is on the left side of the electrodes S11 to S15 of FIG. 3. If the origin of the coordinate system is on the right side of the electrodes S11 to S15, then the processing unit 120 may obtain the position TPX of the touch point TP on the touch panel 10 in the X-axis direction by calculating the Equation 10.

$$TPX = MP + L\_shift1 + L\_shift2 - R\_shift1 - R\_shift2 \quad \text{Equation 10}$$

In the above embodiments, the position of the touch point TP on the touch panel 10 in the X-axis direction is calculated by using the left and right sides adjacent electrodes adjacent the "positioning electrode." However, the implementation of step S270 is not intended to be limited to the particular embodiments described herein. For example, the processing unit 120 may calculate the position of the touch point TP on the touch panel 10 in the X-axis direction based on the position of the "positioning electrode", the sensed value of the "positioning electrode" and the sensed value of another sense electrode adjacent the "positioning electrode." For example, if the left side electrode S12 among the candidate electrodes S12 to S13 is selected as the "positioning electrode" at step S260, then the position of the touch point TP on the touch panel 10 in the X-axis direction may be calculated based on the position of the "positioning electrode" S12, the sensed value of the "positioning electrode" S12 and the sensed value of the right side adjacent electrode S13. On the other hand, if the right side electrode S13 among the candidate electrodes S12 to S13 is selected as the "positioning electrode" at step S260, then the position of the touch point TP on the touch panel 10 in the X-axis direction may be calculated based on the position of the "positioning electrode" S13, the sensed value of the "positioning electrode" S13 and the sensed value of the left side adjacent electrode S12. In these calculation, the calculating rule may be interpolation or another algorithm, for example, $TPX = MP - (L \times D) \div (L + M)$.

The processing unit 120 may calculate the position of the touch point TP on the touch panel 10 in a Y-axis direction based on the sensed values of the sense electrodes S21 to S26 using the same method. The detailed method of determining the position of the touch point TP in the Y-axis direction is similar to the X-axis position determining method as described in the above embodiments and, therefore, explanation thereof is not repeated herein.

Figure 4:
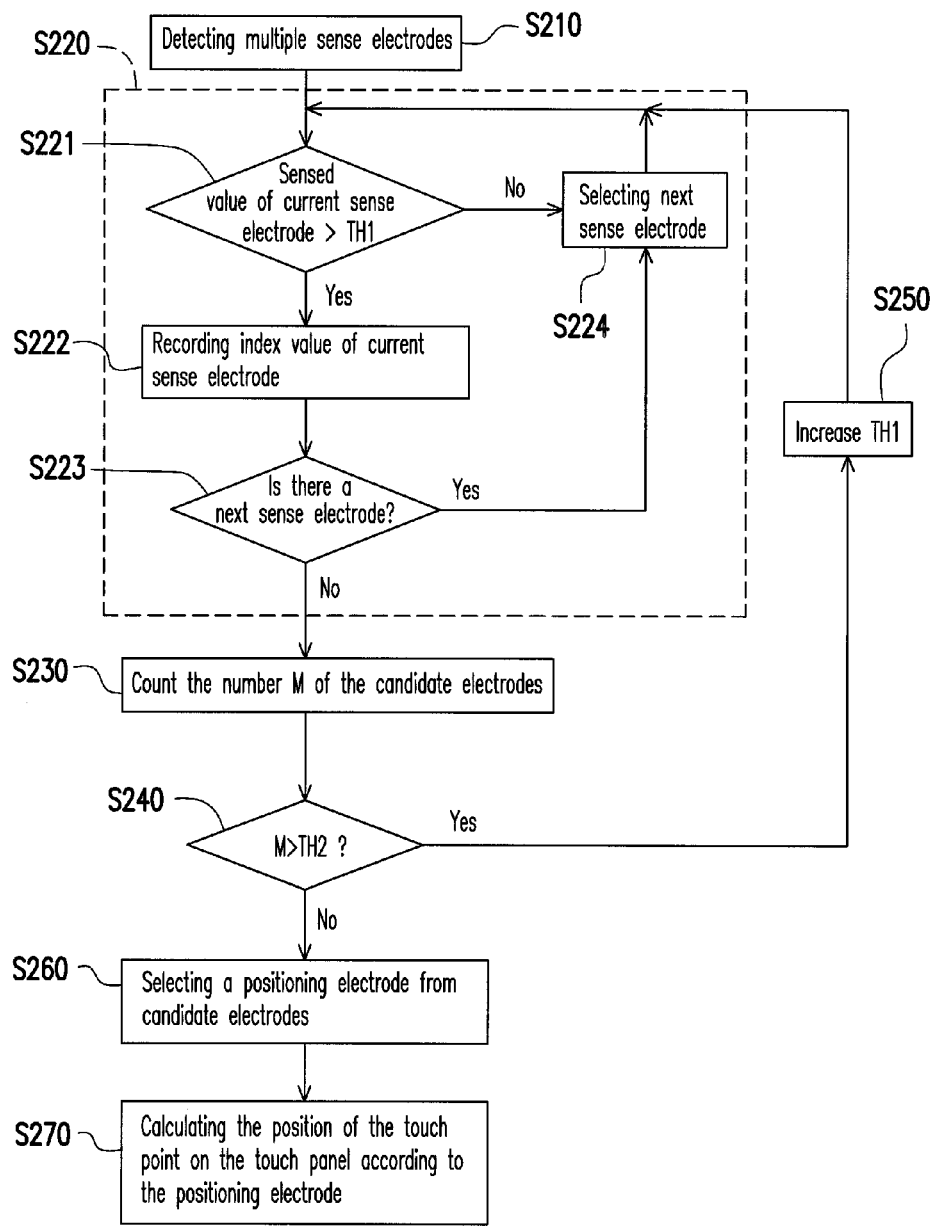
FIG. 4 is a flowchart of a positioning method for the touch panel according to another embodiment of the present invention.

FIG. 4 is a flowchart of a positioning method for the touch panel 10 according to another embodiment of the present invention. For details of the embodiment of FIG. 4, please refer to the related description of FIG. 2. Step S220 includes steps S221 to S224. The sensed value of a currently selected sense electrode is compared with the first threshold value TH1 at step S221. If the sensed value of the current sense electrode is smaller than the first threshold value TH1, it indicates that the touch point TP is not at the position of the current sense electrode and, therefore, the processing unit 120 performs step S224 to select a next sense electrode and then performs step S221 once again. If the sensed value of the current sense electrode is larger than the first threshold value TH1, it indicates that the touch point TP is possibly at the position of the current sense electrode and, therefore, the processing unit 120 records the index value of the current sense electrode (step S222). That is, the processing unit 120 considers the current sense electrode as a candidate electrode. At step S223, it is determined whether there is any sense electrode that has not been checked. If there is any unchecked sense electrode, the processing unit 120 performs step S224 to select a next electrode and then performs step S221 once again. If all the sense electrodes have been check, the processing unit 120 performs step S230.

Figure 5:
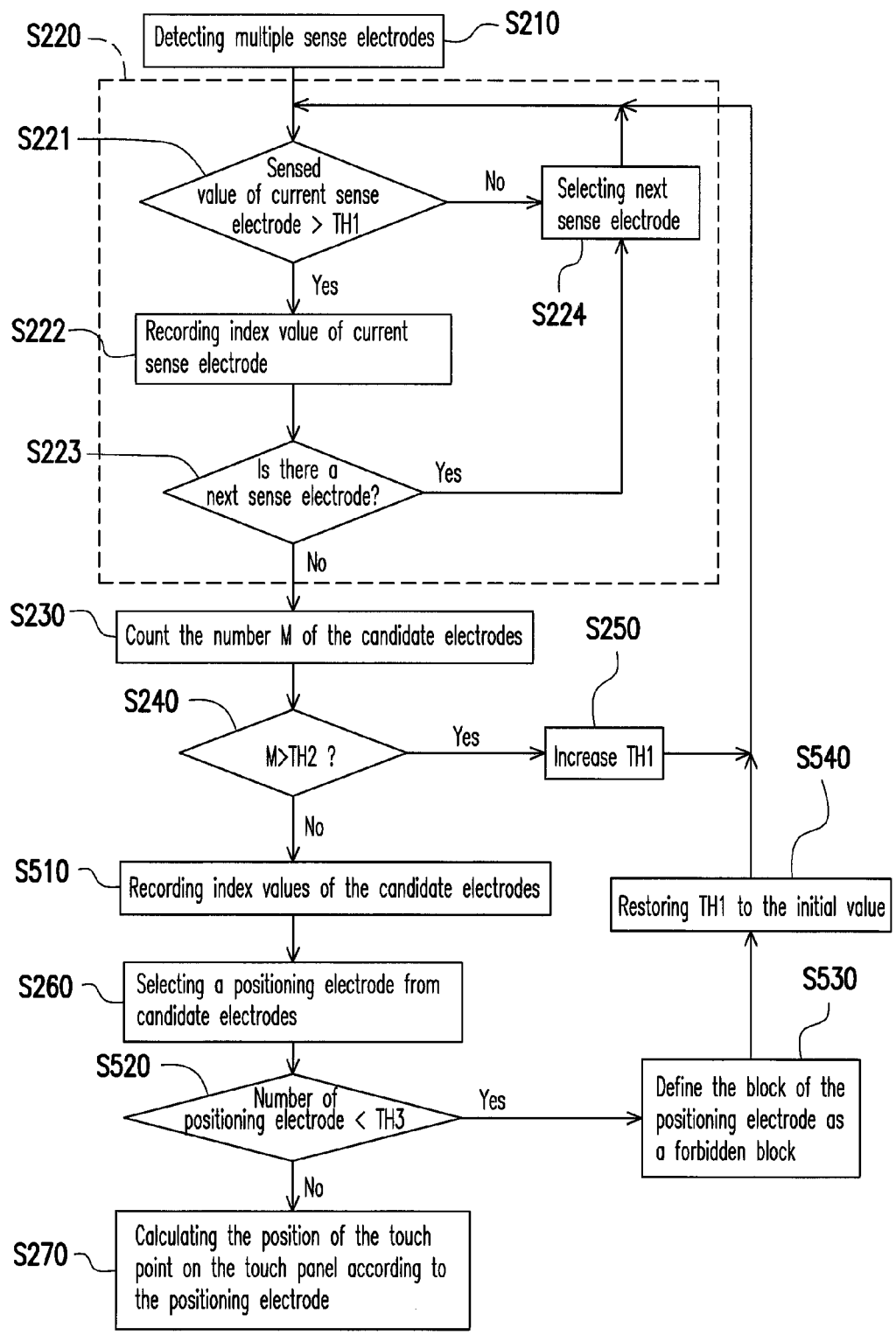
FIG. 5 is a flowchart of a multi-point positioning method for the touch panel according to another embodiment of the present invention.

FIG. 5 is a flowchart of a multi-point positioning method for the touch panel 10 according to another embodiment of the present invention. For details of the embodiment of FIG. 5, please refer to the related description of FIG. 2. After completing step S240, the processing unit performs step S510 to record the index value of the determined candidate. In addition, after completing step S260, the processing unit 120 performs step S520 to determine whether the number of the "positioning electrode" is smaller than a third thresh hold TH3. For example, if the touch panel 10 is set to operate in a two-touch-point sensing mode, the third threshold value TH3 is set to be "2". If it is determined that the number of the "positioning electrode" is not smaller than 2 at step S520, it indicates that the "positioning electrodes" associated with the two touch points on the touch panel 10 have been all found. The processing unit 120 then performs step S270 to respectively calculate the positions of the two touch points on the touch panel 10 in the X-axis (or Y-axis) direction by using these two "positioning electrodes."

If it is determined that the number of the "positioning electrode" is smaller than 2 (the third threshold value TH3) at step S520, it indicates that the processing of steps S220 to S250 ignores another touch point with a small sensed value. Therefore, the processing unit 120 records the determined "positioning electrode" to perform step S530. At step S530, the processing unit 120 defines the area around the determined "positioning electrode" as a forbidden block, such that the processing unit 120 ignores the sensed values of all sense electrodes within this forbidden block during the processing of step S220 to S250. For example, at step s530, the determined "positioning electrode" and two right and two left sides sense electrodes adjacent the "positioning electrode" may be defined as the forbidden block and the sensed values of the five sense electrodes are set as zero. As such, during the processing of later steps S220 to S250, the sensed values of all the sense electrodes within this forbidden block are ignored.

After completing step S530, the processing unit 120 resets/restores the first threshold value TH1 to the initial value TH' (step S530) and returns to step S220 so as to perform the step of finding another "positioning electrode" from all the sense electrodes.

In summary, in various embodiments described above, the processing unit 120 finds multiple candidate electrodes associated with the touch point TP from multiple sense electrodes by dynamic modification of the first threshold TH1 and then selects a positioning electrode from the candidate electrodes. The processing unit 120 then calculates the position of the touch point TP on the touch panel 10 using the position and sensed value of the positioning electrode.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A positioning method for a touch panel having a plurality of sense electrodes along an axis direction, the positioning method comprising:
   detecting the sense electrodes to obtain multiple sensed values;
   performing a checking step to find a plurality of candidate electrodes from the sense electrodes, each candidate electrode having a sensed value larger than a first threshold value;
   performing a counting step to count the number of the candidate electrodes;
   increasing the first threshold value and then performing the checking step and the counting step again if the number of the candidate electrodes is larger than a second threshold value;
   performing a selecting step to select at least one electrode as a positioning electrode from the candidate electrodes if the number of the candidate electrode is not larger than the second threshold value; and
   performing a calculating step to calculate a position of a touch point on the touch panel in the axis direction based on the position and sensed value of the positioning electrode.

2. The positioning method according to claim 1, wherein the selecting step comprises:
   finding a smallest index value from index values of the candidate electrodes; and
   selecting the electrode having the smallest index value as the positioning electrode from the candidate electrodes.

3. The positioning method according to claim 1, wherein the selecting step comprises:
   finding a largest index value from index values of the candidate electrodes; and
   selecting the electrode having the largest index value as the positioning electrode from the candidate electrodes.

4. The positioning method according to claim 1, wherein the selecting step comprises:
   finding a middle index value from index values of the candidate electrodes; and
   selecting the electrode having the middle index value as the positioning electrode from the candidate electrodes.

5. The positioning method according to claim 1, wherein the selecting step comprises randomly selecting an electrode as the positioning electrode from the candidate electrodes.

6. The positioning method according to claim 1, wherein the calculating step comprises calculating the position of the touch point on the touch panel in the axis direction based on the position and sensed value of the positioning electrode and the sensed value of another sense electrode adjacent the positioning electrode.

7. The positioning method according to claim 1, wherein the calculating step comprises calculating the position of the touch point on the touch panel in the axis direction based on the position and sensed value of the positioning electrode and the sensed values of multiple sense electrodes adjacent the positioning electrode.

8. The positioning method according to claim 7, wherein the calculating step comprises:
   calculating a first shift value $L\_shift=(L/M)\times(D/2)$, wherein M is the sensed value of the positioning electrode, L is the sensed value of a left side adjacent electrode adjacent the positioning electrode, and D is a distance between centerlines of two adjacent sense electrodes;
   calculating a second shift value $R\_shift=(R/M)\times(D/2)$, wherein R is the sensed value of a right side adjacent electrode adjacent the positioning electrode; and
   calculating the position of the touch point on the touch panel in the axis direction as $MP-L\_shift+R\_shift$ or $MP+L\_shift-R\_shift$, wherein MP is the position of the positioning electrode.

9. The positioning method according to claim 7, wherein the calculating step comprises:
   calculating a third shift value $L\_shift1=(L1/M)\times(D/2)\times r1$, wherein M is the sensed value of the positioning electrode, L1 is the sensed value of a left side adjacent electrode adjacent the positioning electrode, D is a distance between centerlines of two adjacent sense electrodes, and r1 is a coefficient ranging between 0-1;
   calculating a fourth shift value $L\_shift2=(L2/M)\times(D/2)\times r2$, wherein L2 is the sensed value of a left side adjacent electrode adjacent the electrode L1, and r2 is a coefficient ranging between 0-1;
   calculating a fifth shift value $R\_shift1=(R1/M)\times(D/2)\times r1$, wherein R1 is the sensed value of a right side adjacent electrode adjacent the positioning electrode;
   calculating a sixth shift value $R\_shift2=(R2/M)\times(D/2)\times r2$, wherein R2 is the sensed value of a right side adjacent electrode adjacent the electrode R1; and
   calculating the position of the touch point on the touch panel in the axis direction as $MP-L\_shift1-L\_shift2+R\_shift1+R\_shift2$ or $MP+L\_shift1+L\_shift2-R\_shift1-R\_shift2$, wherein MP is the position of the positioning electrode.

10. The positioning method according to claim 9, wherein $r1+r2=1$.

11. A driving apparatus for a touch panel having a plurality of sense electrodes in an axis direction, the driving apparatus comprising:
    a driving unit adapted to drive and detect the sense electrodes of the touch panel to output a plurality of sensed values of the sense electrodes; and
    a processing unit adapted to receive the sensed values, wherein the processing unit performs a checking step to find a plurality of candidate electrodes from the sense electrodes, each candidate electrode having a sensed value larger than a first threshold value; performs a counting step to count the number of the candidate electrodes; increase the first threshold value and then performing the checking step and the counting step again if the number of the candidate electrodes is larger than a second threshold value; performs a selecting step to select at least one electrode as a positioning electrode from the candidate electrodes if the number of the candidate electrode is not larger than the second threshold value; and performs a calculating step to calculate a position of a touch point on the touch panel in the axis direction based on the position and sensed value of the positioning electrode.

12. The driving apparatus according to claim 11, wherein the processing unit finds a smallest index value from index values of the candidate electrodes; and selects the electrode having the smallest index value as the positioning electrode from the candidate electrodes.

13. The driving apparatus according to claim 11, wherein the processing unit finds a largest index value from index values of the candidate electrodes and selects the electrode having the largest index value as the positioning electrode from the candidate electrodes.

14. The driving apparatus according to claim 11, wherein the processing unit finds a middle index value from index values of the candidate electrodes; and selects the electrode having the middle index value as the positioning electrode from the candidate electrodes.

15. The driving apparatus according to claim 11, wherein the processing unit randomly selects an electrode as the positioning electrode from the candidate electrodes.

16. The driving apparatus according to claim 11, wherein the processing unit calculates the position of the touch point on the touch panel in the axis direction based on the position and sensed value of the positioning electrode and the sensed value of another sense electrode adjacent the positioning electrode.

17. The driving apparatus according to claim 11, wherein the processing unit calculates the position of the touch point on the touch panel in the axis direction based on the position of the positioning electrode, the sensed value of the positioning electrode and the sensed values of multiple sense electrodes adjacent the positioning electrode.

18. The driving apparatus according to claim 17, wherein the processing unit calculates a first shift value $L\_shift=(L/M)\times(D/2)$, calculates a second shift value $R\_shift=(R/M)\times(D/2)$, and calculates the position of the touch point on the touch panel in the axis direction as $MP-L\_shift+R\_shift$ or $MP+L\_shift-R\_shift$, wherein M is the sensed value of the positioning electrode, L is the sensed value of a left side adjacent electrode adjacent the positioning electrode, R is the sensed value of a right side adjacent electrode adjacent the positioning electrode, D is a distance between centerlines of two adjacent sense electrodes, and MP is the position of the positioning electrode.

19. The driving apparatus according to claim 17, wherein the processing unit calculates a third shift value $L\_shift1=(L1/M)\times(D/2)\times r1$, calculates a fourth shift value $L\_shift2=(L2/M)\times(D/2)\times r2$, calculates a fifth shift value $R\_shift1=(R1/M)\times(D/2)\times r1$, calculates a sixth shift value $R\_shift2=(R2/M)\times(D/2)\times r2$, and calculates the position of the touch point on the touch panel in the axis direction as $MP-L\_shift1-L\_shift2+R\_shift1+R\_shift2$ or $MP+L\_shift1+L\_shift2-R\_shift1-R\_shift2$, wherein M is the sensed value of the positioning electrode, L1 is the sensed value of a left side adjacent electrode adjacent the positioning electrode, L2 is the sensed value of a left side adjacent electrode adjacent the electrode L1, R1 is the sensed value of a right side adjacent electrode adjacent the positioning electrode, R2 is the sensed value of a right side adjacent electrode adjacent the electrode R1, D is a distance between centerlines of two adjacent sense electrodes, r1 and r2 are coefficients ranging between 0-1, and MP is the position of the positioning electrode.

20. The driving apparatus according to claim 19, wherein $r1+r2=1$.

* * * * *